(12) United States Patent
Yan

(10) Patent No.: US 9,304,577 B2
(45) Date of Patent: Apr. 5, 2016

(54) REDUCING POWER CONSUMPTION AND WAKEUP LATENCY IN SSD CONTROLLERS BY NOT RESETTING FLASH DEVICES

(71) Applicant: LSI Corporation, San Jose, CA (US)

(72) Inventor: Edward Yan, Sunnyvale, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 240 days.

(21) Appl. No.: 13/917,714

(22) Filed: Jun. 14, 2013

(65) Prior Publication Data

US 2014/0365799 A1 Dec. 11, 2014

Related U.S. Application Data

(60) Provisional application No. 61/831,317, filed on Jun. 5, 2013.

(51) Int. Cl.
*G06F 1/32* (2006.01)
(52) U.S. Cl.
CPC .................................. *G06F 1/3275* (2013.01)

(58) Field of Classification Search
CPC ....... G06F 1/3202; G06F 1/3231; G06F 1/26; G06F 1/206; G06F 1/3228; G06F 1/08; G06F 1/3289; G06F 1/266; H04L 12/12; H04L 12/10
USPC .......................... 713/300, 310, 320, 322, 323
See application file for complete search history.

(56) References Cited

U.S. PATENT DOCUMENTS

| | | | |
|---|---|---|---|
| 8,370,672 B2 | 2/2013 | Thereska et al. | 713/324 |
| 8,766,707 B1 * | 7/2014 | Younger et al. | 327/534 |
| 8,843,700 B1 * | 9/2014 | Salessi et al. | 711/103 |
| 2011/0161900 A1 | 6/2011 | Ginetti et al. | 716/106 |
| 2012/0117409 A1 * | 5/2012 | Lee et al. | 713/340 |
| 2012/0311232 A1 | 12/2012 | Porterfield | 711/103 |
| 2013/0044587 A1 | 2/2013 | Davis et al. | 370/219 |
| 2013/0111239 A1 | 5/2013 | Chen et al. | 713/320 |
| 2014/0281599 A1 * | 9/2014 | Grimsrud et al. | 713/320 |

* cited by examiner

*Primary Examiner* — Zahid Choudhury

(57) ABSTRACT

An apparatus comprising a memory and a controller. The memory processes a plurality of read/write operations. The controller (i) operates in a first power domain to control power savings operations, and (ii) processes the read/write operations in a second power domain. The first power domain is isolated from the second domain.

20 Claims, 4 Drawing Sheets

REDUCING POWER CONSUMPTION AND WAKEUP LATENCY IN SSD CONTROLLERS BY NOT RESETTING FLASH DEVICES

This application relates to U.S. Provisional Application No. 61/831,317, filed Jun. 5, 2013, which is hereby incorporated by reference in its entirety.

FIELD OF THE INVENTION

The invention relates to storage devices generally and, more particularly, to a method and/or apparatus for reducing power consumption and/or wakeup latency in an SSD device by not resetting flash devices.

BACKGROUND

In order to reduce power consumption, conventional Solid State Drive (SSD) controllers power down portions of the controller when they are not in use. When the flash control logic and/or I/O processing are powered down, the flash interface is left in an unknown or undesirable state. From a functional perspective, the power down operations are benign. However, a reset of the flash devices is needed to ensure proper operation when the logic is powered back up. Such a reset operation is both power and time intensive.

SUMMARY

The invention concerns an apparatus comprising a memory and a controller. The memory processes a plurality of read/write operations. The controller (i) operates in a first power domain to control power savings operations, and (ii) processes the read/write operations in a second power domain. The first power domain is isolated from the second domain.

BRIEF DESCRIPTION OF THE FIGURES

Embodiments of the invention will be apparent from the following detailed description and the appended claims and drawings in which:

DETAILED DESCRIPTION OF THE PREFERRED EMBODIMENTS

Embodiments of the invention include a circuit and/or method to reduce power consumption and/or wakeup latency in an SSD device that (i) implements a controller that does not reset the flash devices when entering and/or exiting a lower power state, (ii) provides a first power domain to control power savings operations and a second power domain to process read/write operations, (iii) allows the logic which drives flash I/Os to be powered off and on without causing the flash devices to be reset and/or (iv) provides one or more isolating I/O cells.

Figure 1:
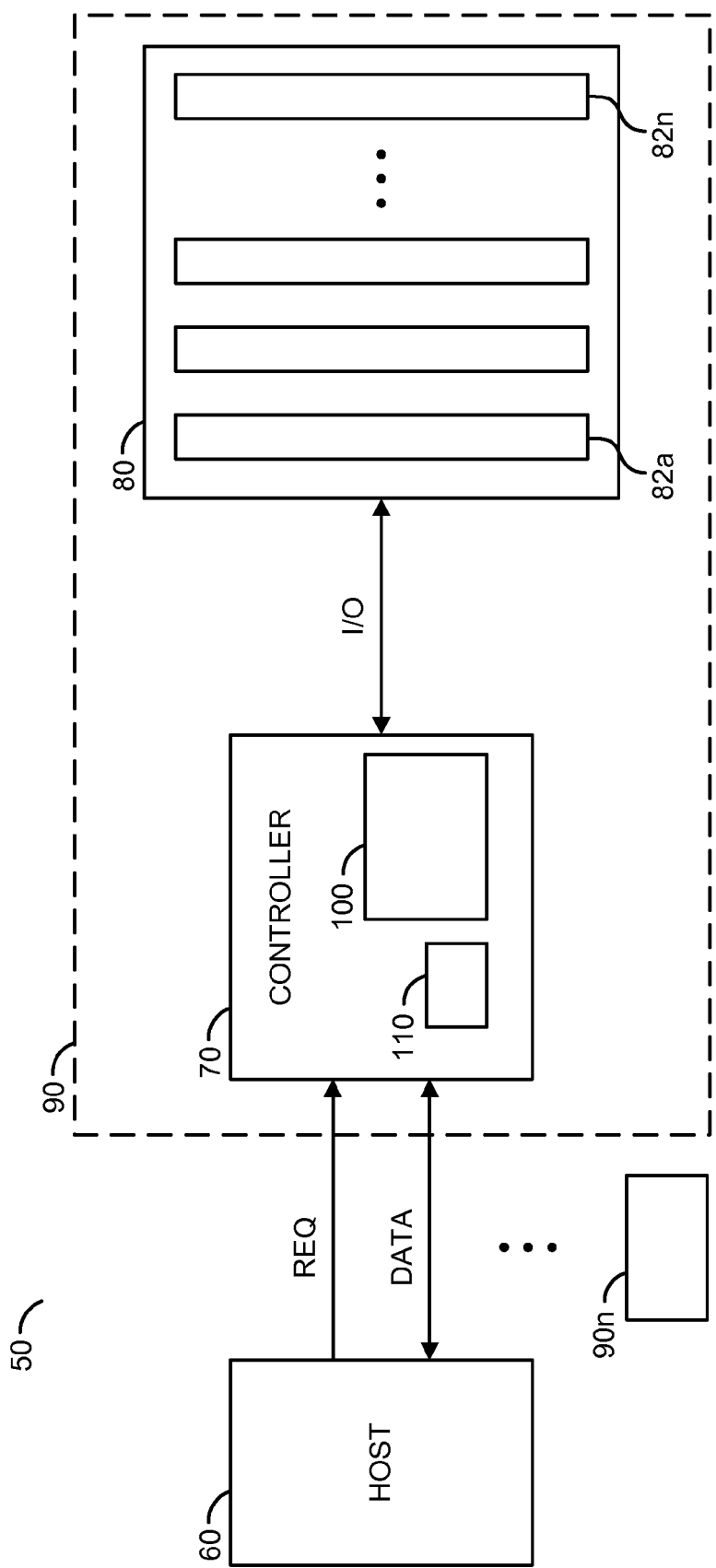
FIG. 1 is a block diagram of a context of embodiments of the invention.

Referring to FIG. 1, a block diagram of an example apparatus 50 is shown. The apparatus 50 generally comprises a block (or circuit) 60, a block (or circuit) 70 and a block (or circuit) 80. The circuit 70 may include a circuit 100. In one example, the circuit 100 may be a memory/processor configured to store computer instructions (or firmware). The instructions, when executed, may perform a number of steps. In another example, the circuit 100 may be implemented as a flash control logic circuit. The controller 70 may also include a power control module 110 (to be described in more detail in connection with FIGS. 2 and 3). The power control module 110 may be implemented as part of the logic circuit 100 or as a separate module. In one example, the power control module 110 may be implemented as hardware (e.g., a number of logic gates, such as a state machine). In the example where the power control module 110 is part of the firmware 100, provisions to power down portions of a domain controlled by the firmware 100 that are not related to power control may be provided.

A signal (e.g., REQ) may be generated by the circuit 60. The signal REQ may be received by the circuit 70. The signal REQ may be a request signal that may be used to access data from the circuit 80. A signal (e.g., I/O) may be generated by the circuit 70 to be presented to/from the circuit 80. The signal REQ may include one or more address bits. A signal (e.g., DATA) may be one or more data portions presented (or received) to (or from) the circuit 60.

The circuit 60 is shown implemented as a host circuit. The circuit 70 reads and writes data to and from the circuit 80. The circuit 80 is generally implemented as a nonvolatile memory circuit. The circuit 80 may include a number of modules 82a-82n. The modules 82a-82n may be implemented as NAND flash chips. In some embodiments, the circuit 80 may be a NAND flash device. In other embodiments, the circuit 70 and/or the circuit 80 may be implemented as all or a portion of a solid state drive 90 having one or more nonvolatile devices. The circuit 80 is generally operational to store data in a nonvolatile condition. When data is read from the circuit 80, the circuit 70 may access a set of data (e.g., multiple bits) identified in the signal REQ. The signal REQ may request data from the drive 90 or from one of a number of additional storage devices (e.g., 90n, etc.).

In some embodiments, the circuit 80 maybe implemented as a single-level cell (e.g., SLC) type circuit. An SLC type circuit generally stores a single bit per memory cell (e.g., a logical 0 or 1). In other embodiments, the circuit 80 may be implemented as a multi-level cell (e.g., MLC) type circuit. An MLC type circuit is generally capable of storing multiple (e.g., two) bits per memory cell (e.g., logical 00, 01, 10 or 11). In still other embodiments, the circuit 80 may implement a triple-level cell (e.g., TLC) type circuit. A TLC circuit may be able to store multiple (e.g., three) bits per memory cell (e.g., a logical 000, 001, 010, 011, 100, 101, 110 or 111). In general, the controller 70 may include an erase/program unit that may implement redundancy across the modules 82a-82n. For example, multiple blocks may be read from multiple dies 82a-82n. An erase/program unit may be implemented as part of the circuit 100.

The SSD drive 90 contains multiple NAND Flash dies (or memory modules) 82a-82n. The dies 82a-82n may operate to read or to write concurrently. The read and write bandwidth depends on how many of the dies 82a-82n are implemented, as well as the bandwidth of each of the dies 82a-82n. If the SSD drive 90 receives a host command, in order to achieve the best performance, and/or to address wear leveling issues, the drive may walk through all of the dies 82a-82n (e.g., a first page of DIE0, DIE1 . . . DIEn, then a next page of DIE0).

The controller 70 allows the flash control logic 100 to be powered down and back up without resetting the flash devices 82a-82n. The controller 70 avoids a reset of the flash devices 82a-82n by maintaining the state of the flash control signals, or a subset of the flash control signals, when the driving logic of the firmware 100 is powered down. In one example, the controller 70 implements a bus keeper operation. In another example, the controller 70 implements isolation features within the flash I/O cells.

In the case of using flash I/O cells with bus keeper functionality, each of the flash I/O cells (e.g., cells within the controller 70 providing a connection to the memory 80) maintains a previous state of a corresponding I/O pad when the bus keeper functionality is enabled. The bus keeper control logic may be implemented as part of the power control module 110. The power control module 110 may operate in a power domain other than the power domain of the flash control logic 100 to allow the bus keeper feature to remain enabled when a majority of the flash control logic 100 is powered off. Moving the state of the control signals between the flash I/O cells and the flash devices 82a-82n to an idle state before enabling the bus keeper function allows the flash control logic 100 to be powered off (e.g., to a low power consumption state) and powered back on without resetting the flash devices 82a-82n.

In the case of using flash I/O cells implementing an isolation function, a combination of high isolating and low isolating flash I/O cells may be used. High isolating cells drive a respective I/O pad high when isolation is asserted. Low isolating cells drive a respective I/O pad low when isolation is asserted. Having the isolation control logic 110 in a power domain other than the flash control logic 100 may allow the isolation feature to remain enabled when the flash control logic 100 is powered off. The high and low isolating cells are instantiated such that when isolation is enabled the isolating cells drive the flash interface control signals to an idle state. Moving the state of the control signals between the flash I/Os and the flash device 80 to the same idle state before enabling isolation allows the flash control logic 100 to be powered off and back on, without resetting the flash devices 82a-82n.

Figure 2:
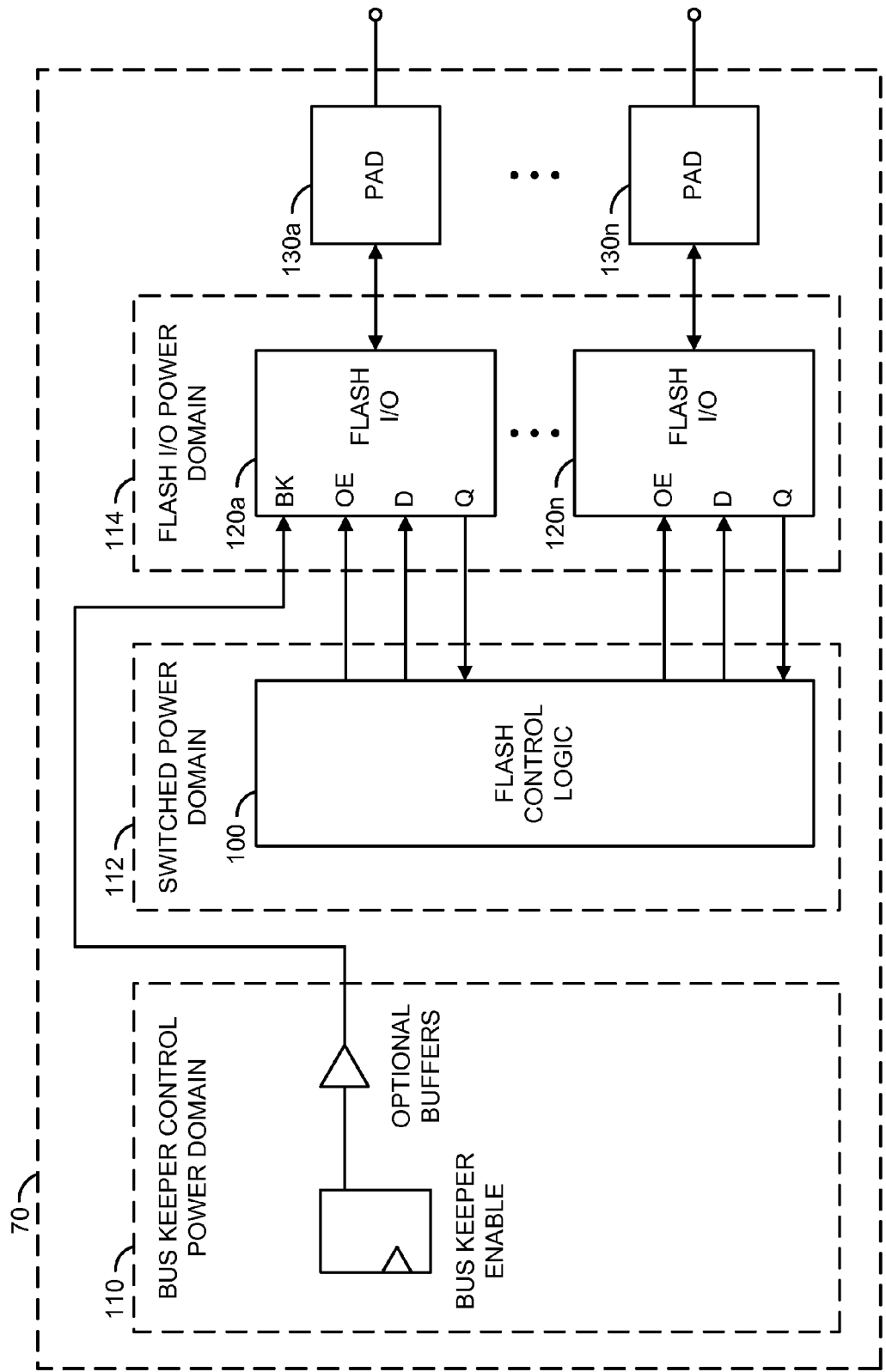
FIG. 2 is a diagram of a bus keeper implementation in a power domain different than the flash control logic.

Referring to FIG. 2, an example of an implementation of the controller 70 using a number of flash I/O cells with bus keeper functionality is shown. The controller 70 generally comprises the block (or circuit) 110, a block (or circuit) 112, and a block (or circuit) 114. The circuit 110 may be implemented as a bus keeper control logic. The circuit 110 may be implemented in a power domain different from the flash control logic 100. The flash control logic 110 may be implemented in a switched power domain. The block 114 generally comprises a number of flash I/O cells 120a-120n. A number of I/O pads 130a-130n are also shown.

In the example implementation of FIG. 2, the flash I/O cells 120a-120n are shown implemented with the bus keeper function. In one example, the bus keeper function may be implemented in the power control module 110. In another example, the flash I/O cells 120a-120n automatically enable the bus keeper function when power is removed from the flash control logic 112. The control circuit 110 may drive an input (e.g., BK) on one or more of the I/O cells 120a-120n to enable the bus keeper functionality.

The signals between flash control logic 100 and the flash I/O cells 120a-120n are shown illustrating a general interface. The I/O cells 120a-120n are each shown having a data out port (e.g., D), an output enable port (e.g., OE) and a data in port (e.g., Q). The data out port D may present a signal with a value that may be used to drive one of the pads 130a-130n when writing data to flash device 80. Different names of the data out port may be implemented. For example, other commonly used names may be "A" and/or "I". The output enable port OE may control the direction of data to/from the flash I/O cells 120a-120n. In one example, the output enable OE may be an active high or an active low signal received at an input of each of the I/O cells. When the signal OE is asserted, one of the I/O cells 120a-120n will drive the value of "D" to a respective one of the pads 130a-130n. While the signal OE is shown, other names, such as OEN are also commonly used (e.g., if the output enable is active low). The data in port Q is shown representing a value of one of the pads 130a-130n. The value Q may be used to send data read from flash device 80 back to the flash controller 100 (e.g., the circuit 90). While the value Q is shown, other commonly used names include X, Z, O, and/or C.

Figure 3:
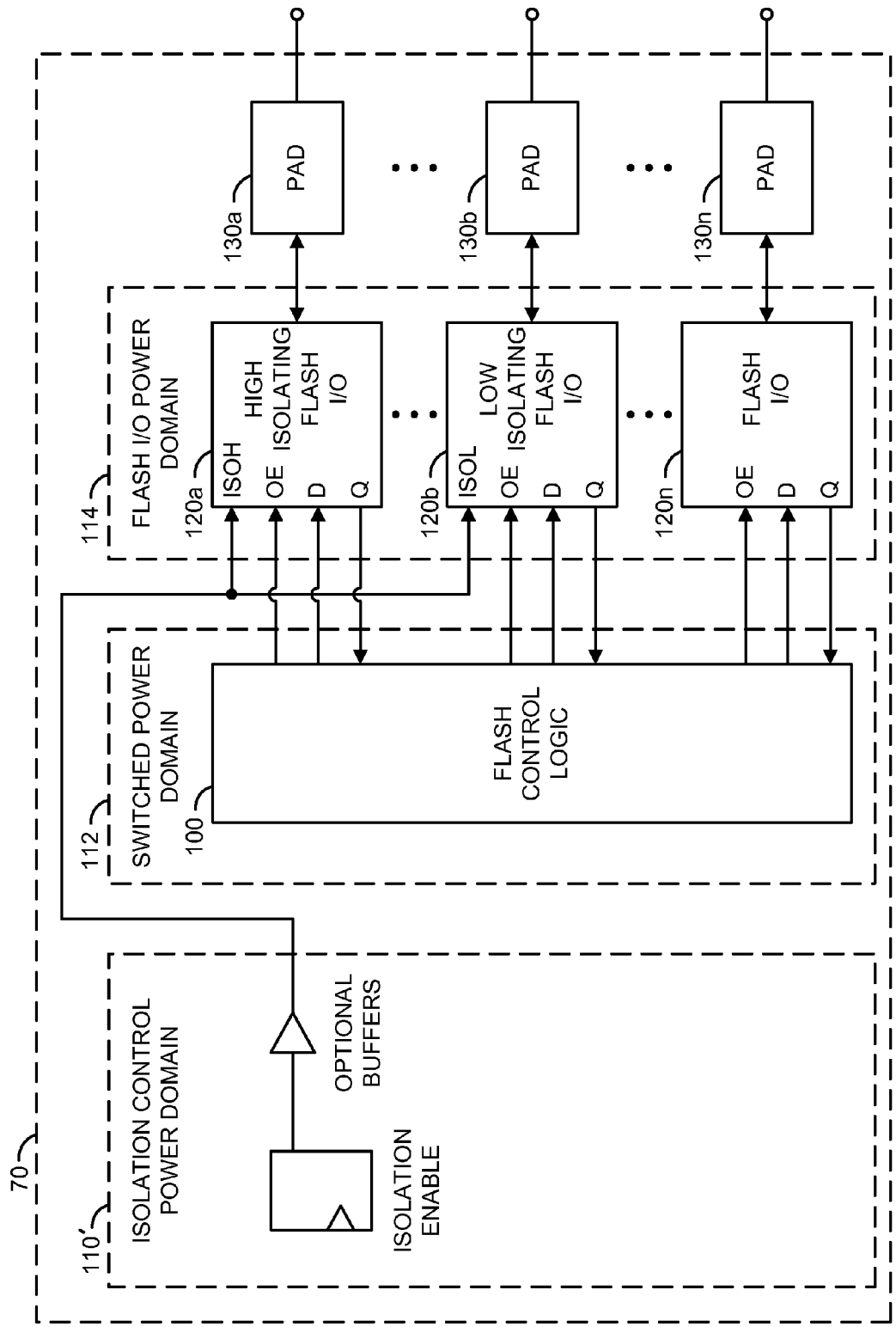
FIG. 3 is a diagram of an implementation showing high and low isolation.

Referring to FIG. 3, an example of an implementation using the flash I/O cells 120a-120n implemented with a high and low isolation function is shown. The I/O cell 120a is shown implemented as a high isolating flash I/O cell. The flash cell I/O 120b is shown implemented as a low isolating flash I/O cell. The particular number of high isolating cells and low isolating cells may be varied to meet the design criteria of a particular implementation.

The isolation control logic 110' may be implemented in a power domain different from the power domain 112 flash control logic 100. For example, the flash control logic 100 is shown implemented in a switched power domain 112. A high isolating I/O cell 120a and a low isolating I/O cell 120b are shown implemented in the flash I/O power domain 114. In one example, the isolation control logic may be implemented in the block 110'. In another example, the flash I/O cells 120a-120n may automatically drive respective I/O pads 130a-130n to high or low state when power to the flash control logic 100 is turned off. The circuit 110' may drive an input (e.g., ISOH, ISOL, etc.) on one or more of the flash I/O cells 120a-120n.

In another alternative implementation, the flash I/O cells 120a-120n may be implemented without an isolation function. In such an example, isolation logic may be implemented in a power domain other than the power domain containing the flash control logic.

For the I/O cells 120a-120n operating in bus keeper mode (e.g., FIG. 2), an input named BK is shown. When asserted, a signal received at the input BK will cause one of the I/O cells 120a-120n to drive one of the I/O pads 130a-130n to whatever value the pad happened to be at when the signal BK is asserted. For the I/O cells 120a-120n operating in isolation mode (e.g., FIG. 3), instead of remembering the previous state of a respective one of the pads 130a-130n, two different cells are used. The I/O cells 120a-120n are shown having an isolation control input (e.g., ISOH), which when asserted, will cause the respective I/O cell 120a-120n to drive a predetermined value (e.g., high or low). In the example shown, the names ISOH and ISOL are used. However, other names may be used, with the type of I/O cell implemented (e.g., high isolating or low isolating) being instantiated. In another example, a generic isolating I/O cell may be implemented, where a predetermined value is presented as an input to the cell, then tied to either a constant high or constant low.

Figure 4:
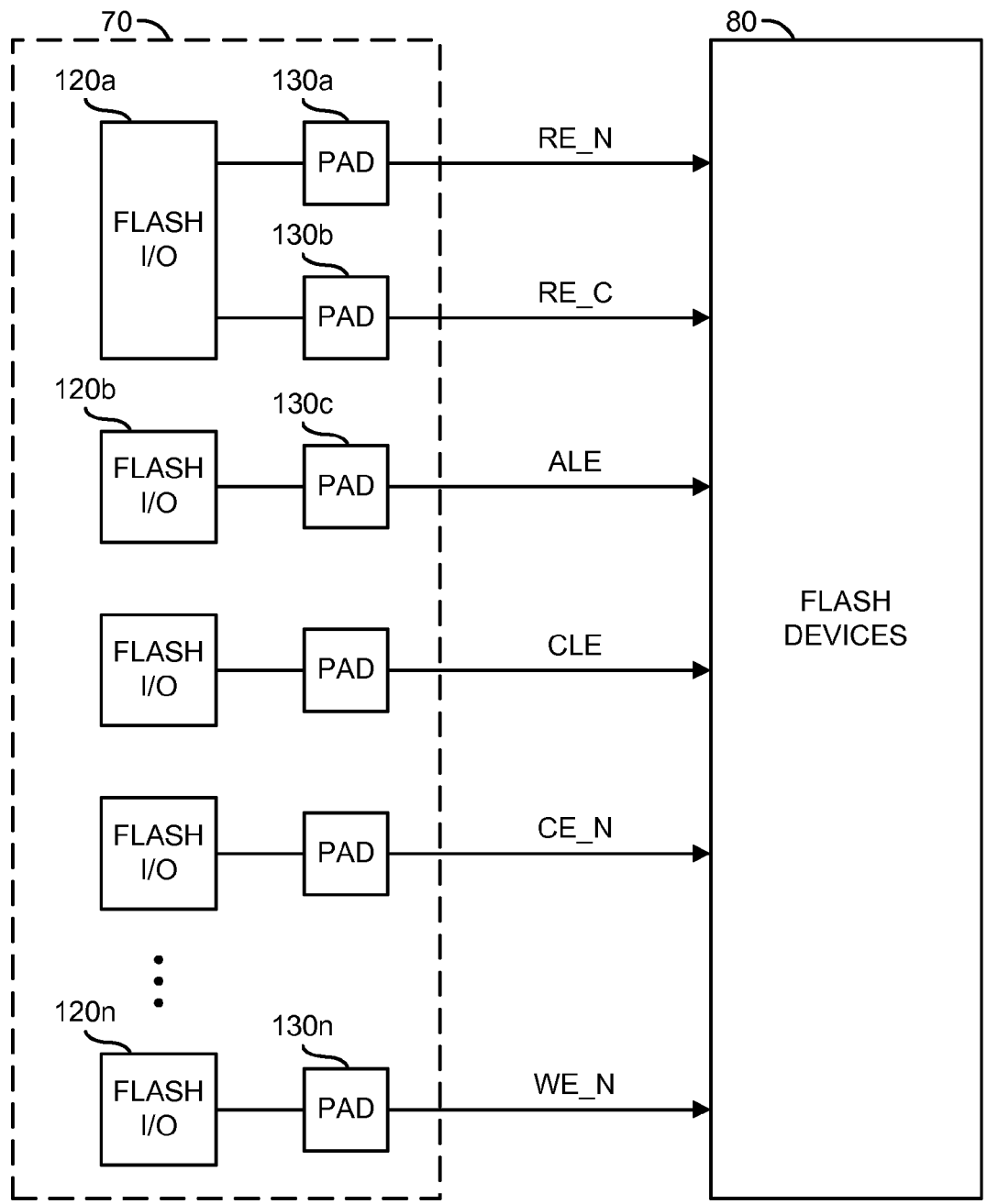
FIG. 4 is a diagram illustrating examples of the various flash control signals.

Referring to FIG. 4, a diagram of the controller 70 is shown connected to the flash devices 80. A number of control signals RE_N, RE_C, ALE, CLE, CE_N, and WE_N are shown. The flash I/O cells 120a-120n are shown connected to the I/O pads 130a-130n, which send the control signals to the flash devices 80.

The flash devices 82a-82n typically receive one or more of the following set of flash control signals RE_N/RE_C, ALE, CLE, CE_N, and/or WE_N from the I/O pads 130a-130n. One way to maintain the idle state on the flash interface is to drive the flash control signals as follows:

1. RE_N—high/RE_C—LOW
2. ALE—LOW

3. CLE—LOW
4. CE_N—HIGH
5. WE_N—HIGH

In general, the signal RE_C is present on the flash devices 82a-82n which use a differential read enable. In general, it is not necessary to drive all of the flash control signals RE_N, RE_C, ALE, CLE, CE_N, and/or WE_N to the described values to achieve the idle state. For example, driving the signal CE_N to a high state may achieve the idle state.

In the isolation example, when one of the signal ISOH and/or the signal ISOL is asserted, the flash I/O cells 120a-120n should be driven to an idle state. When one of the signals ISOH and/or ISOL is asserted, some of the flash control signals will drive low, such as the signal ALE and/or the signal CLE. The signal CE_N and/or the signal WE_N will normally drive high when the signal ISOH is asserted. When one of the signals ISOH and/or ISOL is not asserted, the flash control logic normally has control of the IO cells 120a-120n.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The functions performed by the diagrams of FIG. 3 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to embodiments thereof, it will be understood by those skilled in the art that various changes in form and details may be made without departing from the scope of the invention.

The invention claimed is:

1. An apparatus comprising:
a memory; and
a controller in communication with said memory, the controller comprising a first portion configured to operate in a first power domain and a second portion configured to operate in a second power domain isolated from the first power domain, the first portion comprising an input/output (I/O) cell operating in the first power domain, the second portion comprising an I/O pad operating in the second power domain and corresponding to the I/O cell, the first portion further configured to control power saving operations and use the I/O cell to maintain a previous state of the I/O pad, and the second portion of the controller further configured to process read/write operations to/from said memory.

2. The apparatus according to claim 1, wherein said second power domain is configured to be powered down and powered up while said first power domain remains powered up.

3. The apparatus according to claim 2, wherein said memory comprises a plurality of memory modules, wherein said apparatus reduces power by powering down the second power domain without resetting the plurality of memory modules.

4. The apparatus according to claim 1, wherein (i) said controller further comprises a plurality of I/O cells, (ii) each of said I/O cells has a corresponding I/O pad, and (iii) each of said I/O cells maintains a previous state of said corresponding I/O pad.

5. The apparatus according to claim 4, wherein said apparatus operates in a bus keeper mode.

6. The apparatus according to claim 4, wherein one or more of said plurality of said I/O cells comprises an isolation cell.

7. The apparatus according to claim 6, wherein said one or more of said plurality of said isolation cells are configured to drive a respective one of said I/O pads to a low state when isolation is asserted.

8. The apparatus according to claim 6, wherein said isolation cell is configured to drive a respective one of said I/O pads to a high state when isolation is asserted.

9. The apparatus according to claim 3, wherein said plurality of memory modules comprise flash memory modules.

10. The apparatus according to claim 1, wherein said memory comprises a plurality of memory modules, and wherein each memory module of said plurality of memory modules has a size less than a total size of said memory.

11. The apparatus according to claim 1, wherein said controller comprises a solid state drive (SSD) controller.

12. The apparatus according to claim 4, wherein each of said I/O cells operate in said first power domain and said corresponding I/O pad operates in said second power domain.

13. The apparatus according to claim 12, wherein maintaining said previous state of said corresponding I/O pad includes maintaining a state of one or more control signals communicated between said I/O cells and said corresponding I/O pad, wherein said power saving operations comprise removing power from said second portion of said controller, and wherein each of said I/O cells are configured to automatically maintain said previous state of said corresponding I/O pad when power is removed from said second power domain.

14. An apparatus comprising:
an interface configured to communicate a plurality of read/write operations to/from a memory, the interface comprising:
a control circuit comprising a first portion configured to operate in a first power domain and a second portion configured to operate in a second power domain isolated from the first power domain, the first portion of the control circuit further configured to control power saving operations, and the second portion of the control circuit further configured to process said plurality of read/write operations for said interface; and
an input/output (I/O) cell that operates in the first power domain and maintains a previous state of a corresponding I/O pad when a power saving operation is enabled, and wherein said I/O pad operates in said second power domain.

15. The apparatus according to claim 14, further comprising a first logic circuit and a second logic circuit, wherein said first portion of said controller includes said first logic circuit and said second portion of said controller includes said second logic circuit, and wherein said second power domain is a switched power domain allowing said first logic circuit to switch power provided to said second logic circuit off and on without resetting the memory.

16. The apparatus according to claim 15, wherein said first portion of said controller maintains a state of said second portion of said controller, wherein the state maintained is a state of one or more control signals prior to switching off power to the second logic circuit.

17. A method for reducing power consumption in a drive controller, comprising the steps of:
operating a first portion of a controller in a first power domain to control power saving operations, the first portion comprising an input/output (I/O) cell;
operating a second portion of said controller in a second power domain to process read/write operations to/from a memory, the second portion comprising an I/O pad corresponding to the I/O cell, wherein said first power domain is isolated from said second power domain; and
maintaining a previous state of the I/O pad with the I/O cell when a power saving operation is enabled.

18. The method according to claim 17, wherein said method reduces a wakeup latency when processing said plurality of read/write operations resumes after the second portion of the controller exits a low power state.

19. The method according to claim 17, wherein said method is implemented in a solid state drive (SSD) controller.

20. The method according to claim 17, wherein said memory comprises a flash memory.

* * * * *